Figure 1:
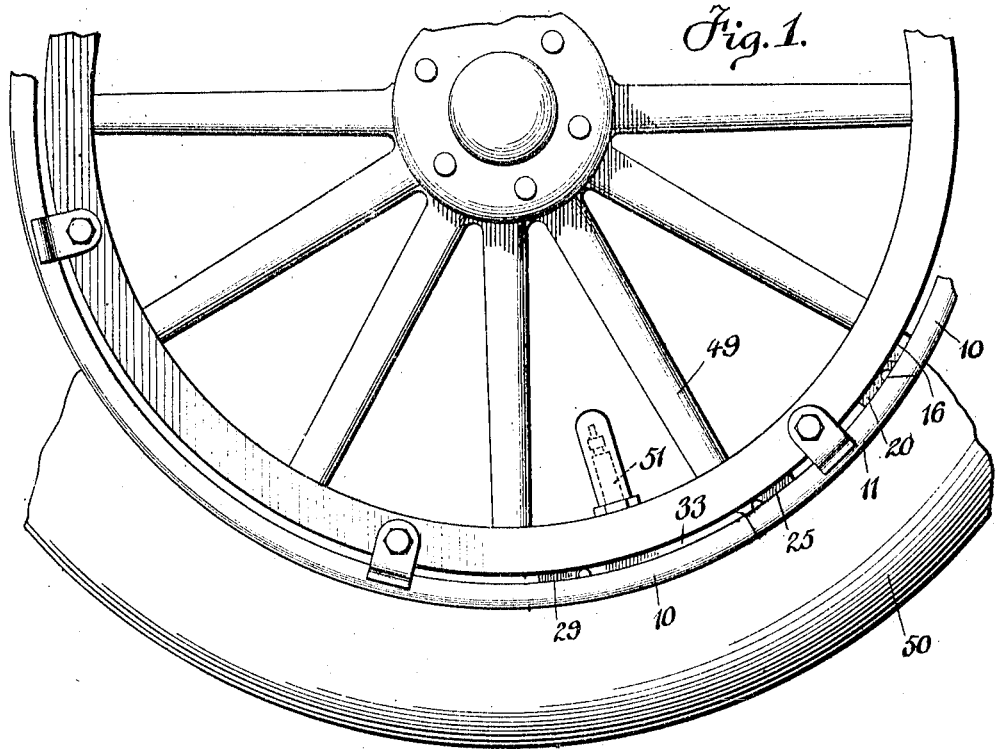

J. H. M. MICHON.
EXPANSIBLE WHEEL RIM.
APPLICATION FILED APR. 4, 1917.

1,314,414.

Patented Aug. 26, 1919.
2 SHEETS—SHEET 1.

Inventor
J. H. M. Michon

By
*[signature]*, Attorneys.

J. H. M. MICHON.
EXPANSIBLE WHEEL RIM.
APPLICATION FILED APR. 4, 1917.
1,314,414.
Patented Aug. 26, 1919.
2 SHEETS—SHEET 2.
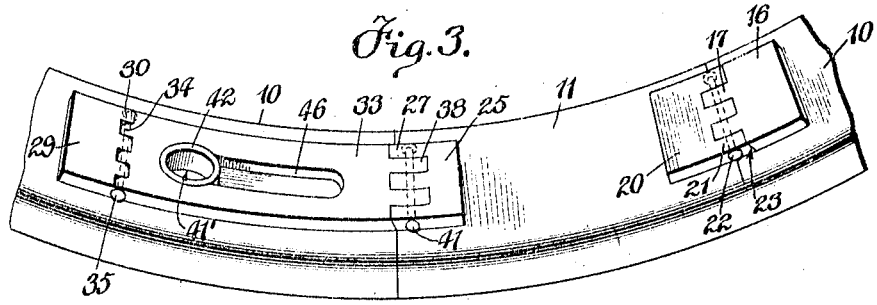
Inventor
J. H. M. Michon

UNITED STATES PATENT OFFICE.

JOSEPH H. M. MICHON, OF WASHINGTON, DISTRICT OF COLUMBIA.

EXPANSIBLE WHEEL-RIM.

1,314,414.  Specification of Letters Patent.  Patented Aug. 26, 1919.

Application filed April 4, 1917. Serial No. 159,708.

*To all whom it may concern:*

Be it known that I, JOSEPH H. M. MICHON, a subject of the King of England, residing at Washington, in the District of Columbia, have invented certain new and useful Improvements in Expansible Wheel-Rims, of which the following is a specification.

This invention relates to an improved tire rim for motor vehicles and has as its primary object to provide a structure whereby the tire may be easily and quickly placed upon or removed from the rim.

The invention has as a further object to provide a rim having a hinged rim section which may be displaced so that the extremities of the rim body may move toward each other for freeing the tire.

A further object of the invention is to provide an arrangement wherein the hinged rim section will be connected with the extremities of the rim body in such manner that the said rim section may be swung upon the body of the rim for spreading the extremities thereof to expand the rim to its normal circumference for engagement with the tire and shifting the rim section to active position between the ends of the rim body with the said rim section completing the rigid rim.

The invention has as a still further object to provide a construction wherein the rim section will be automatically locked when swung to active position and wherein the hinge connections for the said rim section as well as the locking means therefor will be disposed entirely upon the inner side of the rim and within the side lines thereof.

The invention has as a further object to provide an arrangement wherein the hinged rim section will be locked against lateral movement at its outer end and wherein a wedging action will be produced between the locking member for the said section and the seat therefor to insure constantly tight joints between the parts and overcome any rattling.

And the invention has as a still further object to so form the hinged rim section that the said section will not when swung to active position, pinch or cut the sides of the tire.

Figure 2:
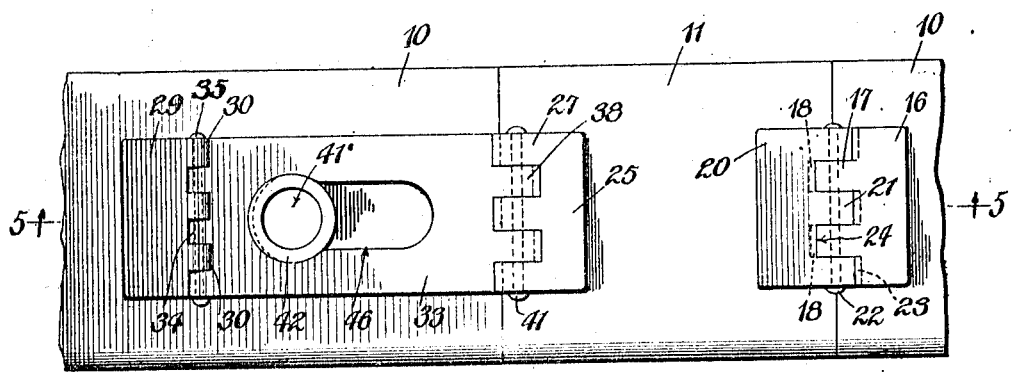

Other and incidental objects will appear as the description proceeds and in the drawings wherein I have illustrated the preferred embodiment of the invention and wherein similar reference characters designate corresponding parts throughout the several views:

Figure 1 is a fragmentary side elevation showing my improved rim applied to a conventional type of vehicle wheel, Fig. 2 is a fragmentary plan view particularly showing the mounting of the hinged section of the rim, Fig. 3 is a fragmentary perspective view more particularly illustrating the manner in which the hinged rim section is formed to fit between the ends of the rim body, Fig. 4 is a fragmentary perspective view showing the hinged rim section moved to inactive position from between the ends of the rim body, Fig. 5 is a sectional view taken on the line 5—5 of Fig. 2 and showing the manner in which the elements associated with the hinged rim section are adapted to fit together, in the closed position of the said section, and Fig. 6 is a detail perspective view of the link plate connecting the free end of the hinged rim section with the rim body.

In carrying out the invention, my improved rim is formed with a split body 10 with which is arranged to coact a rim section 11. The rim may be of any approved type and at one end, the body thereof is formed with a beveled edge 12 while the inner end of the rim section 11 is formed with a similarly beveled edge 13. Formed in the opposite end of the rim body between the side edges thereof is a notch 14 providing, as shall presently appear, a seat for the locking rib of a link plate connecting the outer end of the rim section with one end of the rim body. This seat is formed with an inner longitudinal beveled edge 15.

Mounted upon the end of the rim body adjacent the beveled edge 12 thereof is a hinge plate 16 which may be formed integral with the inner side of the rim or may be secured thereto in any other approved manner. This plate is formed with spaced hinge lugs 17 having, as shown in dotted lines in Fig. 5, terminal beveled edges 18. At the inner ends of the lugs 17, the plate is undercut to provide a beveled edge 19. Mounted upon the inner side of the rim section 11 at the inner end thereof, is a hinge plate 20. This plate is similar to the plate 16 and may be formed integral with the rim section or otherwise secured thereto. Formed on the plate 20 are spaced hinge lugs 21 mating with the hinge lugs 17 of the plate 16 and connected thereto by a suitable pivot pin 22. The lugs 21 at their outer ends are formed with beveled edges 23 adapted to mate with the beveled edge 19 of the plate 16 while the notches in the plate 20 receiving the lugs 17 are, as also particularly shown in Fig. 5, formed with inner beveled edges 24 adapted to mate with the beveled edges 18 of the lugs 17 of the plate 16.

Mounted upon the inner side of the hinged rim section 11 at the outer end thereof, is a hinge plate 25. This plate is similar to the plates 16 and 20 and may also be formed integral with the hinged rim section or otherwise secured thereto. In this connection, it will be observed that the plate 16 serves to reinforce the adjacent terminal of the rim body 10 while the plates 20 and 25 serve to reinforce the terminals of the hinged rim section. If desired, the plates 20 and 25 may be formed integral to extend the entire length of the rim section and thus act as a reinforcing member extending from end to end of the said section. The plate 25 is formed with notches opening through the bottom wall of the hinged rim section and provided with inner beveled edges 26. These notches define a plurality of hinge lugs 27 upon the said plate and the said lugs are also formed with terminal beveled edges 28. Mounted upon the inner side of the rim body near the extremity thereof provided with the notch 14 and arranged in spaced relation to the adjacent terminal of the said rim body is a hinge plate 29. This plate is similar to the hinge plates previously described and may be formed integral with the rim body or otherwise secured thereto. Formed on the plate are hinge lugs 30.

Connected to the plate 29 is a link plate 33 shown in detail in Fig. 6, of the drawings. This link plate is, at the adjacent end thereof, provided with hinge lugs 34 mating with the hinge lug 30 of the plate 29 and connected therewith by a pivot pin 35 extending through the said lugs. At its outer end, the plate 33 is formed with spaced hinge lugs 38 provided with terminal beveled edges 39 and at the inner ends of the said lugs, the plate is formed with a terminal beveled edge 40. The lugs 38 are arranged to mate with the hinge lugs 27 of the plate 25 and pivotally connecting the said lugs is a suitable pivot pin 41 extending through the lugs with the terminal beveled edges 28 of the lugs 27 adapted to mate with the beveled edge 40 of the plate and with the beveled edges 39 of the lugs 38 adapted to mate with the beveled edge 26 of the notches in the plate 25. As will now be seen, the rim section 11 is hingedly connected at one end to one end of the rim body 10 with the outer end of the said rim section hingedly connected with the opposite extremity of the rim body by the link plate 33.

Formed through the rim body at a point spaced inwardly from the notch 14 is an opening 41' adapted to freely receive the valve stem of a tire and surrounding this opening is an upstanding locking boss 42 adapted to coact with the plate 33. The outer vertical wall of this boss is upon the inner side of the boss undercut to provide a beveled edge 43. Formed through the plate 33 to receive the boss 42 is an opening 44 and the wall of this opening is at the inner side of the said opening, formed with a beveled edge 45 adapted to coact with the beveled edge 43 of the said boss. Extending longitudinally of the plate and communicating with the opening 44 is a slot 46 the purpose of which will presently appear. The plate is further formed upon its lower side and at the outer end thereof with a transverse locking rib 47 which provides a reinforcing member for the said plate. This locking rib is adapted to fit within the seat or notch 14 in the rim body and is provided with an inner beveled edge 48 adapted to coact with the beveled edge 15 of the said notch.

As will now be seen from the preceding description, the hinge rim section 11 and the link plate 33 form, in effect, a toggle and by pushing down upon the meeting ends of the said rim section and plate as for instance by the foot, the extremities of the rim body will spread when the hinged rim section will swing to fit in active position between the ends of the rim body with the link plate 33 lying flat against the inner side of the rim. The rim may thus be readily expanded to engage the tire and in this connection, it is to be observed that owing to the provision of the beveled edges 12 and 13 upon the meeting ends of the rim body and hinged rim section, the said rim section will not, when swung into active position, pinch or cut the sides of the tire. Furthermore, attention is directed to the fact that when the hinged rim section is swung into position between the ends of the rim body, the locking rib 47 upon the plate 33 will be shifted to engage within the notch 14 of the rim body with the beveled edges 15 and 48 of the said notch and rib respectively wedging against each other and thus held in engagement by the resilient action of the rim body. This wedging action between the locking rib and the rim body will tend to obviate any looseness between the free ends of the hinged rim section and the rim body with the locking rib acting to hold the free extremity of the said rim section as well as the free extremity of the locking plate 33 against lateral movement with respect to the rim. Also, it is to be noted that when the hinged rim section is swung to active position, the beveled edges of the plates 16 and 20 and coacting beveled edges of the hinge lugs 17 and 21 of the said plates will be moved into wedging engagement. In like manner, the beveled edges of the link plate 33 and hinge plate 25 and coacting beveled edges of the hinge lugs 27 and 38 of the said plates will also be moved into wedging engagement to be held tightly in contact by the spring action of the rim body. At the same time, the locking plate 33 will be shifted to receive the locking boss 42 through the opening 44 in the said plate with the beveled edge 43 of the said locking boss wedged in engagement with the beveled edge 45 of the said opening. The rib will thus act to lock the plate against accidental upward displacement to free the hinged rim section 11 with the beveled edges of the several elements at the joints between the parts coacting to provide a tight fit between the said parts and thus overcome any rattling.

In Fig. 1 of the drawings, I have shown my improved rim applied to a conventional type of wheel 49 with a standard type of tire 50 fitted to the rim and provided with a valve stem 51. This stem is fitted loosely through the stem opening 41 in the rim body to project through the opening 44 in the link plate 33 and is, of course, received through the rim of the wheel in the usual manner. For removing the tire, the rim is displaced from the wheel when by prying upwardly upon the outer end of the hinged rim section 11, the said section may be readily displaced from between the ends of the rim body and thus permit the extremities of the rim body to contract for freeing the tire. In this connection, the purpose of the slot 46 in the link plate 33 becomes apparent since it will be seen that when the valve stem 50 is in position projecting through the openings 41' and 44 in the rim body and the said plate respectively, the said stem will be received within the slot in the said plate when the plate is swung upwardly for displacing the hinged rim section. When the tire is initially applied to the rim, the portion of the tire adjacent the ends of the rim body will be relatively free. The valve stem may thus be readily inserted through the rim since owing to the position of the valve stem opening in the rim, the portion of the tire carrying the valve stem will always be arranged adjacent the ends of the rim body and will thus be free to manipulate.

It will therefore be seen that I provide a particularly simple and efficient construction for the purpose set forth and an arrangement wherein the tire may be readily placed upon or removed from the rim. Furthermore, the hinge connections for the hinged rim section are arranged entirely upon the inner side of the rim and within the side lines thereof so that when the rim is placed in position upon the wheel, the said connections will be housed between the rim and the rim of the wheel. This provides a construction making the accidental displacement of the hinged rim section impossible since the said rim section, being arranged to confront the wheel rim, will be prevented from pivoting inwardly by the rim of the wheel.

Having thus described the invention, what is claimed as new is:

1. A device of the character described including a split rim body, a rim section hingedly connected at one end to one end of the rim body, means hingedly connecting the other end of the said rim section to the opposite end of the rim body, the said rim section being movable to spread the ends of the body of the rim and fit between said ends, and means carried by the rim body and engageable with said first mentioned means for locking the said first mentioned means to hold the said rim section against displacement, the said last mentioned means being adapted to receive a tire stem projecting from the outer side of the rim therethrough and through the said first mentioned means.

2. A device of the character described including a split rim body, a rim section hingedly connected at one end to one end of the rim body, means hingedly connecting the other end of the said section to the opposite end of the rim body and movable with the rim section for spreading the ends of the body of the rim to dispose the rim section between said ends, the rim body being formed with a notch, and a shoulder carried by the said means to engage in said notch for locking the free extremity of the rim section against transverse movement with respect to the rim body.

3. A device of the character described including a split rim body, a rim section hingedly connected at one end to one end of the rim body, means hingedly connecting the other end of the rim section to the opposite end of the rim body, and locking means for the said first mentioned means carried by the rim body, the said first mentioned means being movable with the rim section to spread the ends of the body of the rim and shift into wedging engagement with said locking means for holding the rim section against inward displacement fitting between the ends of the rim body.

4. A device of the character described including a split rim body, a rim section hingedly connected at one end to one end of the rim body, means hingedly connecting the other end of the rim section to the opposite end of the rim body and formed with a beveled shoulder, and a locking boss carried by the rim body and formed with a beveled shoulder adapted to coact with said first mentioned shoulder, the said means being movable with the rim section to spread the ends of the body of the rim and shift the said first mentioned shoulder into wedging engagement with the shoulder of the said boss for locking the rim section against inward displacement fitting between the ends of the rim body.

5. A device of the character described including a split rim body, a rim section hingedly connected at one end to one extremity of the rim body, means hingedly connecting the other end of the rim section to the opposite end of the rim body and provided with a slot terminating at one end in an opening, the rim body being formed with an opening, and a locking boss carried by the rim body to surround the said opening therein, the said means being movable with the rim section to spread the ends of the body of the rim and shift said means to a position receiving the said boss through the said opening in said means, and engaging with the wall of the opening for locking the rim section against inward displacement, the rim section fitting between the ends of the rim body with the said openings adapted to receive a tire valve stem to be accommodated within said slot upon the movement of said means relative to the stem.

6. A device of the character described including a split rim body, a rim section, a hinged connection between the inner end of the rim section and one end of the rim body, a link, a hinged connection between the inner end of the link and the opposite end of the rim body, and a hinged connection between the outer ends of the link and rim section, one of the said hinged connections being formed with inclined shoulders, the rim section being movable to spread the ends of the body of the rim and fit between said ends in position with the said shoulders coacting for binding the link and rim section between the pivot points at their outer ends.

7. A device of the character described including a split rim body, a rim section hinged at one end to one end of the rim body upon the inner side face thereof, and a link plate hingedly connected at one end to the outer end of the rim section and at its opposite end to the other end of the rim body upon the inner side face thereof and in spaced relation to the adjacent end of the rim body, the said plate and rim section coacting to provide toggle members of substantially equal length standing at an obtuse angle with respect to each other inwardly from the rim whereby a direct outward radial pressure may be brought to bear upon the meeting ends of the said members for spreading the ends of the rim body and shifting the rim section to a position fitting between the ends of the body.

8. A device of the class described including a split rim body, a rim section swingingly connected adjacent one end to one end portion of the rim body, the rim body being formed at one end with a notch, a link plate swingingly connecting the opposite end portion of the rim section with the other end portion of the rim body and adapted to coöperate with the rim section for spreading the extremities of the body of the rim and shifting the rim section to active position fitting between the ends of the rim body, and a laterally extending head formed on the link plate and adapted to engage in said notch in the active position of the hinged rim section for locking the free extremity of the rim section against transverse movement with respect to the rim body.

In testimony whereof I affix my signature.

JOSEPH H. M. MICHON. [L. S.]